(12) United States Patent
Piehler

(10) Patent No.: US 6,439,726 B1
(45) Date of Patent: Aug. 27, 2002

(54) SYSTEM IN WHICH LIGHT IS DIRECTED FROM A LIGHT SOURCE ONTO A SURFACE

(75) Inventor: Eberhard Piehler, Nerkewitz (DE)

(73) Assignee: Carl Zeiss Jena GmbH, Jena (DE)

( * ) Notice: Subject to any disclaimer, the term of this patent is extended or adjusted under 35 U.S.C. 154(b) by 0 days.

(21) Appl. No.: 09/508,932

(22) PCT Filed: Jun. 8, 1999

(86) PCT No.: PCT/JP99/03961
§ 371 (c)(1),
(2), (4) Date: Mar. 17, 2000

(87) PCT Pub. No.: WO00/04710
PCT Pub. Date: Jan. 27, 2000

(30) Foreign Application Priority Data

Jul. 17, 1998 (DE) .......................................... 198 32 317

(51) Int. Cl.⁷ .............................................. G03B 21/28
(52) U.S. Cl. ............................ 353/98; 353/84; 348/743
(58) Field of Search .......................... 353/98, 99, 119, 353/84, 102, 97; 348/742, 743, 771

(56) References Cited

U.S. PATENT DOCUMENTS

| | | | |
|---|---|---|---|
| 5,184,253 A | 2/1993 | Hwang | |
| 5,564,811 A | 10/1996 | Lim | |
| 5,633,755 A | 5/1997 | Manabe et al. | |
| 5,839,808 A | * 11/1998 | Koyama et al. | 353/97 |
| 6,113,240 A | * 9/2000 | Iizuka | 353/31 |
| 6,260,974 B1 | * 7/2001 | Koyama | 353/98 |
| 6,266,105 B1 | * 7/2001 | Gleckman | 353/84 |

FOREIGN PATENT DOCUMENTS

| | | |
|---|---|---|
| DE | 82 17 721.0 | 4/1987 |
| DE | 40 25 136 A1 | 2/1992 |
| DE | 196 26 097 C1 | 10/1997 |
| EP | 0 436 738 | 7/1991 |
| EP | 734 183 A2 | 9/1996 |
| JP | 06-034931 | 2/1994 |

OTHER PUBLICATIONS

*English Abstract of DE 40 25 136 A1.
*English Abstract of DE 196 26 097 C1.

* cited by examiner

Primary Examiner—William Dowling
(74) Attorney, Agent, or Firm—Reed Smith LLP

(57) ABSTRACT

An arrangement in which light is directed onto a surface proceeding from a light source by first optics, so that an image is formed which can be detected by second optics, the arrangement having first, second and third partial optics and an optical axis as common optical axis for the first partial optics (22) and second partial optics (24) by which the second optics are formed. The light coming from the third partial optics and incident in the second partial optics encloses an angle relative to the common optical axis at which the third partial optics lie outside of an area traversed by the light reflected by the reflecting surface from the second partial optics (24) to the first partial optics (22).

20 Claims, 3 Drawing Sheets

SYSTEM IN WHICH LIGHT IS DIRECTED FROM A LIGHT SOURCE ONTO A SURFACE

BACKGROUND OF THE INVENTION

1. Field of The Invention

The invention is directed to an arrangement in which light is directed onto a surface proceeding from a light source by means of first optics, so that an image is formed which can be detected by means of second optics.

2. Description of The Invention

Arrangement in which light is directed onto an object from a light source for illumination, for example, in order to be able to observe an image through second optics, are known from microscopy, for example. Further, transparency or film projectors are known in which a light bundle originating from a light source is projected by means of a condenser for uniform illumination on a transparency or film image which is then shown on a screen by an objective serving as second optics.

However, under present consideration is a more recent technology in which video images are-generated by means of tilting mirror arrays. These tilting mirror arrays comprise a field of individual tilting mirrors which can assume two states, zero and one, depending on the adjusted reflection direction. The quantity of rows and columns of the field correspond to the video standard for lines and image points/lines of the video image to be displayed. To enable gray values or colors of individual image points as well, the image mirrors allocated to the latter are acted upon by a pulse train depending on the image point information, wherein this pulse train switches the tilting mirrors rapidly between reflection in one of two directions and reflection in the other direction, so that a corresponding intermediate value between light and dark is adjusted in the timing means by the pulse repetition rate between the zero and one states. Such tilting mirror arrays are available, for example, from Texas Instruments.

As in the above-mentioned projectors, the optics used in tilting mirror arrays of the type mentioned above are formed of optics for illumination of the tilting mirror array and second optics which are normally referred to as an objective for the projection of the image content onto a screen, wherein both front projection and rear projection are possible.

The term "screen" is meant herein in a very broad sense. In particular for laser shows, for example, screen also refers to the mist from a fog machine or a water wall.

Because of space problems in illumination, optics with long intersection lengths were previously used as first optics and second optics, so that a determined size was always required for these projectors with tilting mirrors. Moreover, because of the long light distances, light losses are possible so that input power requirement and therefore also the heat output to be carried off increase, which likewise causes a larger structural shape. Therefore, in smaller projectors which accordingly also have desirable reductions in heat output, an image with large screen diagonals is no longer possible at all.

However, small and light-intensive projectors are in demand. They should be portable and under normal room illumination should generate a sufficiently bright image of suitable dimensions. Efforts are already being made to replace the portable projectors just now appearing on the market with the newest generation of significantly smaller projectors, so-called palm top projectors. These projectors need substantially smaller optical systems for the illumination optics as well as for the projection objective. An effort could be made to achieve this through miniaturization of the known optics, but the heat problem and the resulting additional expenditure on cooling would still represent a barrier. Further, the tilting mirror arrays must still have a certain size in order to reflect a sufficient amount of light.

A similar set of problems also results in reflective LCDs, especially those with tilted LCD elements.

It is the object of the invention to find a novel arrangement for illumination and projection which will allow miniaturized projectors of the kind mentioned above to be realized.

This object which at first appears unattainable in view of the requirements mentioned above is met proceeding from the prior art indicated above by means of dividing the first and second optics into first, second and third partial optics, wherein the first and second partial optics have, in each instance, a common optical axis and form the second optics. The incident light for illumination proceeds from the third partial optics and the third partial optics and second partial optics form the first partial optics. To enable projection, the light coming from the third partial optics and falling on the second partial optics encloses an angle to the common optical axis at which the third partial optics lie outside of an area traversed by the light reflected by the surface from the second partial optics to the first partial optics.

First of all, it is unexpected that a such a division into first, second and third partial optics is possible, since the preceding prior art, due to the long intersection distances for the illumination of the tilting mirror arrays mentioned by way of example as well as for imaging the image contents of the latter, required small apertures, as a result of which, as experience shows, the beam paths of the illumination light and of the reflected light must then overlap. Because of the small aperture angles normally used, it would not be possible to uncouple the light paths of the light bundle falling on the tilting mirror array through partial optics from that of the light reflected by the tilting mirror array. Only the arrangement according to the invention makes it possible to realize the partial optics with appropriately short intersection lengths, so that the usable apertures can be selected so as to be suitably large enough and a sufficiently large path for the third partial optics is kept open so that the light proceeding from the tilting mirror array is passed without hindrance. The special design of optics of this type is known to the person skilled in the art.

This solution differs sharply from the usual solutions for miniaturization of known devices. In particular, it would have been expected that the person skilled in the art would have devoted a substantial amount of thought to the realization of a particularly space-saving cooling means based on recognition of the heat-related problems occurring in miniaturization.

However, suitable cooling means generally do not pose a problem in the arrangement according to the invention because the substantial heat-generating elements, the tilting mirror array and the light source, lie outside of the three partial optics. The backs of these elements thus remain entirely free, so that, in contrast to known arrangements, with respect to cooling no particular attention need be paid to the space that must be reserved for optical elements. Accordingly, compact, efficient cooling means can also be used for the tilting mirror array.

It has turned out unexpectedly that an increased light intensity is also achieved with the arrangement according to the invention. This stems from the fact that due to the smaller intersection lengths for illumination and for collecting the light which originates from the tilting mirror array and is to be projected, the distance of the tilting mirror array from the optics is substantially less than can be maintained in the prior art, so that fewer light losses occur.

The third partial optics can be introduced in principle between the first and second partial optics with respect to the optical axis. However, still greater compactness can be achieved according to an advantageous further development of the invention in which an optical axis of the third optics encloses an angle of less than or equal to 90° with the optical axis of the second partial optics and in which there is provided a device for deflecting the light bundle, especially a mirror or a prism, by which the light proceeding from the third partial optics is directed into the second partial optics. Compactness can be further improved by means of the mirror or prism which takes away substantially less space than that usually occupied by lens optics, e.g., the third partial optics. Further, the mirror or prism, especially at the indicated angle of less than 90°, also provides for a projection or extension of the light path for the illumination light by which an improved focusability and uniformity of illumination can be achieved for a tilting mirror array mentioned by way of example. The apertures for illumination which were already described as especially favorable can also be realized with this lengthened path.

In contrast to the mirror, a prism can be configured in such a way that light bundles of different colors are divided and, after this splitting, are then directed to different tilting mirror arrays on which different color extracts are then adjusted for displaying color images. Compared with other solutions, for example, with a color wheel, this brings about a light output with respect to the supplied electric output which is higher as a whole.

In principle, the device for deflection of the light bundle can be introduced at any optional location between the first partial optics and second partial optics. On the other hand, it is more favorable with respect to optics and also more advantageous with respect to reduced space requirement as will also be made clear from an embodiment example described hereinafter when the device for deflection is at a distance from this pupil surface of the second optics which is not more than half of the pupil diameter. The pupil surface of the second optics in this case is that surface which is determined by the second partial optics and which is formed by the points in which light beams proceeding from the reflecting surface which have the same angle but different reflection locations are collected.

Because of the principle upon which the invention is based, the third partial optics can be formed in such a way, for example, that a light source focused on a point is imaged through these partial optics on the point of the tilting mirror array mentioned by way of example. With respect to uniformity of imaging, however, it has been shown to be substantially more economical when the third partial optics are constructed so as to focus, that is, when a parallel beam is changed into a point. It is then possible to start from a parallel beam on the input side of the second optics, this parallel beam being focussed subsequently for imaging on the tilting mirror array, For guiding the light onto the input side of the second partial optics, while there is generally more space required for the third partial optics in this case for generating the parallel light beam, the uniformity of the illumination is substantially increased. A greater space requirement is then also not necessary when using the above-mentioned device for deflection of the beam path.

As was already made clear, a substantial advantage of the invention consists in the special possibility for optimizing apertures for imaging as well as for illumination. In particular, the following further developments of the invention have proven especially advantageous, wherein the second partial optics on the side of the reflecting surface have an aperture of greater than 0.3, in particular, 0.5, and the third partial optics are designed for an illumination angle θ on the reflected surface behind the second partial optics with sin θ less than 0.3, in particular less than 0.2. When the aperture is increased, there is a smaller spacing between the reflecting surface indicated by way of example as tilting mirror array than in the known prior art. Due to this favorable aperture for illumination, it is ensured in a simple manner that the light proceeding from the tilting mirror array can be projected onto the screen unimpeded by the illumination optics.

The features indicated in detail above prove especially advantageous when the reflecting surface is a rectangular image-generating element, especially a tilting mirror array or a reflecting LCD, and the light bundle striking the third partial optics has a rectangular beam profile adapted to it with respect to lateral magnification.

The advantage of using the arrangement according to the invention in a tilting mirror array has already been made clear above. Due to the fact that the light bundle has a rectangular beam profile which is adapted to its lateral magnification or aspect ratio, it is possible that the light used for illumination is brought virtually completely to the tilting mirror array, so that a maximum light intensity is generated on the image.

The most uniform possible illumination is likewise advantageous in tilting mirror arrays. In order to be able to economize on optical elements according to an advantageous further development of the invention, a mixing rod for generating the rectangular beam profile is provided in front of the third optics. A mixing rod mixes the light proceeding from a light source by multiple reflection. For example, a prismatic rod with rectangular input and output faces can be used for this purpose, wherein when the light from the light source passes through at the outer surface area, total reflection is carried out multiple times, so that the location on the surface area of the prismatic mixing rod from which the light proceeds is practically independent from the point of incidence. Accordingly, an evenly illuminated rectangular field is generated which is imaged on the tilting mirror array.

In principle, this mixing rod could be arranged in front of or behind the third partial optics. However, in order to promote compactness, it has proven extremely favorable when the mixing rod is provided between the illumination device and the third optics.

In order to display color images, a color wheel is normally provided in this tilting mirror array technology, even when there is only a single array. A color wheel known in this connection from the prior art is a circular disk having at its circumference a plurality of sectors with different color filters. This color wheel is rotated quickly in order to generate a color image, so that the light is filtered sequentially with respect to different colors.

Further, the information content on the tilting mirror array is synchronized with the respective colors of the individual color filters through which the light passes for illuminating the array. because of the inertia of the eye and the adapted rotational speed of the color wheel, the different colors are perceived simultaneously and the different color extracts adjusted sequentially on the tilting mirror array are detected as a single color video image.

According to an advantageous further development, however, this construction is modified in that an individual tilting mirror array and a color wheel are provided for displaying color images, wherein the color wheel is the outer surface area of a cylinder which is divided into sectors with filters of different colors and which covers the input and/or output surface of the mixing rod. In this way, a particularly compact arrangement is achieved because, due to the cylindrical construction compared with the known circular disk, only a single dimension is used vertical to the longitudinal extension of the mixing rod for the color wheel. This is explained more fully later with reference to the Figures.

Normally, increased expenditure on adjustment is required in such optics according to the prior art in order to adapt the corresponding axes to one another. In this case, however, according to a preferred further development of the invention, it has proven advantageous that an adjustability of the tilting mirror array with respect to position and/or angular position is made possible as an element for adjustment.

A possibility for correcting angle and distance is sufficient for optimal adjustment of the illumination direction and the light passage through the first and second partial optics.

The invention will be described more fully hereinafter with reference to embodiment examples in connection with the accompanying drawings.

DESCRIPTION OF THE PREFERRED EMBODIMENTS

Figure 1:
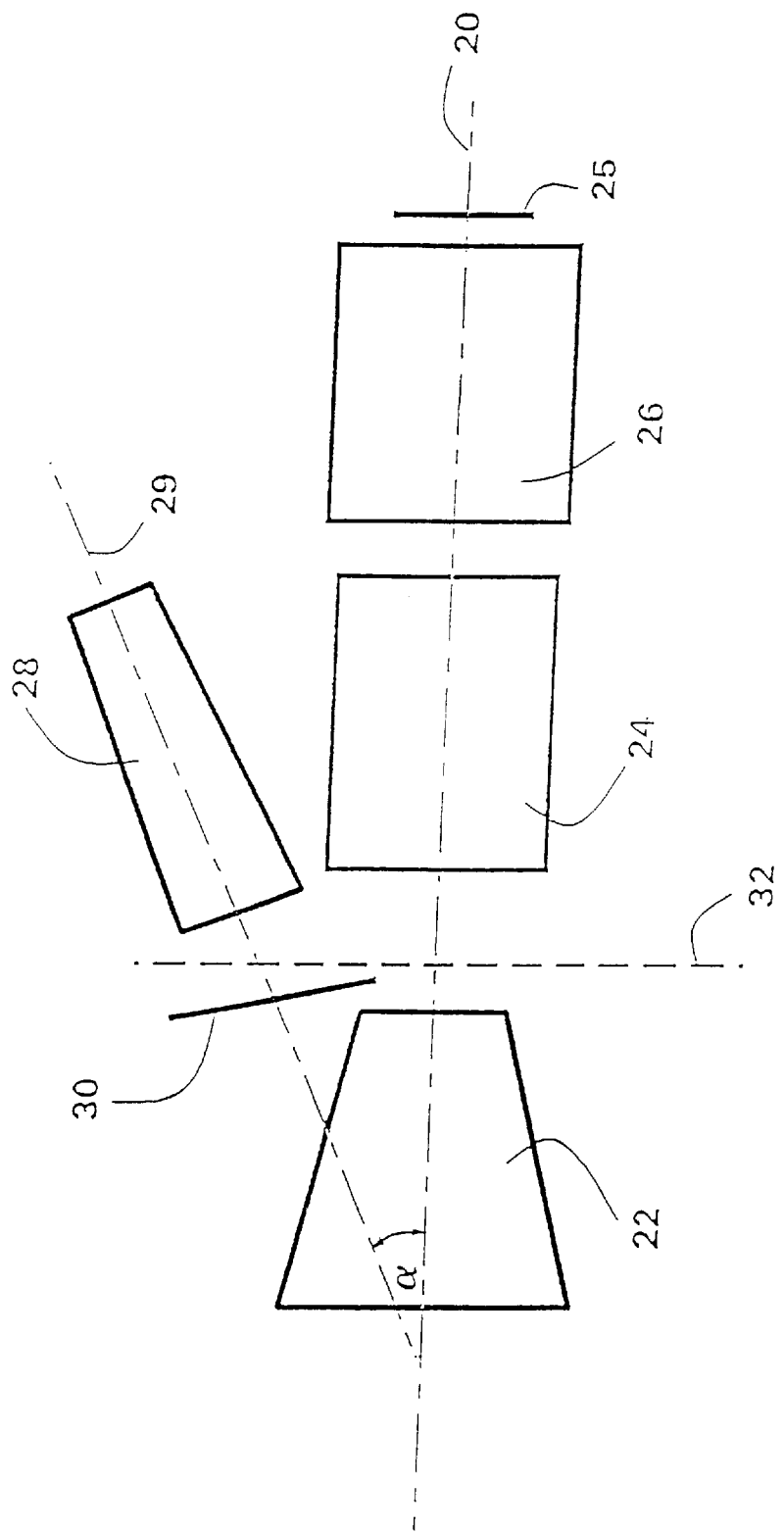
FIG. 1 shows a schematic view of an arrangement for explaining the principle used in the invention.

In the following, the principle upon which the invention is based will be described with reference to a projector with tilting mirror arrays without thereby limiting generality or universality. The arrangement according to the invention can also be used advantageously for other cases of illumination, for example, in microscopes or episcopes.

First partial optics 22 and second partial optics 24 are arranged on an optical axis 20 and together form projection optics by which an image represented on a reflecting surface 25 is displayed on a projection screen. The reflecting surface 25 was formed by a digital tilting mirror array (DMD array) as was described already in the beginning. If three DMD arrays are used instead of an individual DMD array for the different color extracts, a prism 26 can also be used optionally in addition by which the illumination light is split into light bundles of three different colors which are then directed to three different DMD arrays arranged at an angle.

Instead of directing separate illumination optics on the reflecting surface 25 for illumination as is known from the prior art, it is proposed herein that the second partial optics 24 are also used for illumination at the same time and the light provided for this purpose is directed via third partial optics 28 and a device for deflection in the second partial optics 24. In the example of FIG. 1, a mirror 30 is shown as a device for deflection.

The third optics 28 lie with their optical axis 29 outside of the optical axis 20 which accordingly lies at an angle α to the optical axis 20 of the first partial optics 22 and second partial optics 24. This angle α should be ≦90°. In particular, very steep angles α between 60° and 90° have proven advantageous as can be seen more clearly, for example, in FIGS. 2 and 3.

In contrast to the prior art, substantially smaller section lengths are achieved in this case because the second partial optics 24 are also used as partial optics for projection. For this reason, the reflecting surface 25 can be advanced substantially closer to the second partial optics 24. The focusability is improved so that more light is also available for projection than in the known prior art.

The favorable aperture value for the light for illumination which is made possible in this way and the light collected for projection further allow the reflecting surface 25 to be guided closer to the second partial optics.

As will become clearer from the subsequent Figures, the apertures of the optics overall are so designed that the light to be projected extends outside of an area through the optics 24 and 26 in which the illumination light is directed to the reflecting surface 25. This means that the mirror 30 for coupling in does not interfere with the light for projection because it does not lie in its beam path; therefore, all of the light originating from the reflecting surface 25 can be used for projection.

For an arrangement of this kind, it has proven particularly favorable when the second partial optics 24 are focusing optics which change the light reflected from the reflecting surface 25 into the pupil plane 32 of the second optics which is also the pupil plane of the first optics, proceeding from which the first partial optics 22 project the image on the projection wall.

Further, the light proceeding from the third partial optics 28 is also projected on the pupil surface 32. For this purpose, it has proven particularly advantageous optically when the mirror 30 lies between the pupil surface 32 and the first partial optics as is shown in FIG. 1.

Figure 2:
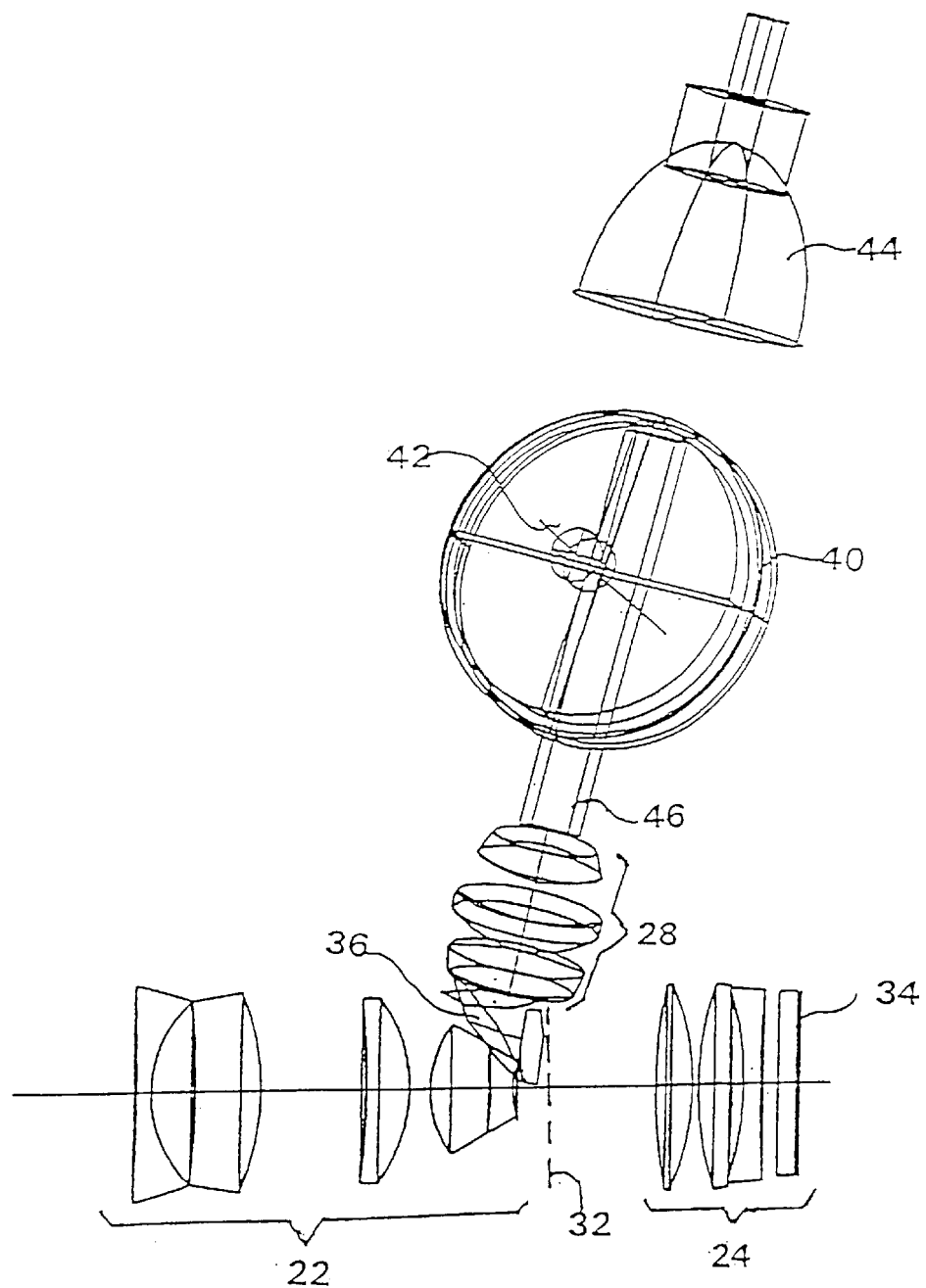
FIG. 2 shows a particularly advantageous construction of the invention for the illumination of a DMD array.

FIG. 2 shows an embodiment example in which no color splitter prism 26 is used because in this case only an individual DMD array 34 is used. The DMD array 34 is adjustable with respect to angle and position in order to be able to adjust optically. The partial optics 22, 24 and 28 are indicated in FIG. 2 in greater detail as lens groups. However, a prism system 36 is shown by way of example instead of the mirror 30 in contrast to the embodiment example in FIG. 1.

However, a color wheel is also used for color image display with an individual tilting mirror array. A special color wheel 40 is shown in FIG. 2. In contrast to the prior art, this color wheel is not a disk, but is constructed as an outer surface area of a cylinder, wherein its cylinder length need only have approximately the size of the light bundle in front of the third partial optics 28. This economizes on space compared with a disk.

This outer surface area is provided with different color filters which were constructed in the embodiment example by means of dielectric layers. This color wheel 40 rotates faster than 1/10 revolutions per second about its axis of rotation 42, so that, due to the inertia of the eye, an observer perceives the colors produced by the provided color filters on the outer surface area seemingly simultaneously. The image contents on the DMD array 34 are adjusted synchronously with these colors. The eye of an observer thus experiences a color image projected via the partial optics 22.

Further, in order to illuminate the DMD array 34 as evenly as possible, a mixing rod 46 is provided. This mixing rod is constructed as a glass rod at whose outer surface total reflection takes place. The information about the origin of the light emission is lost as a result of the repeated total reflection, so that a uniformly illuminated rectangular field results at the end of the mixing rod 46. This uniformly illuminated rectangular field is directed via the third partial optics 28 and the second partial optics 24 to the DMD array. Particularly advantageous in this case is a rectangular mixing rod 46 which is adapted with respect to its aspect ratio of the outlet surface to the dimensions of the DMD array 34 in order that as little primary light as possible is lost from the lamp 44 for illuminating the DMD array 34.

Figure 3:
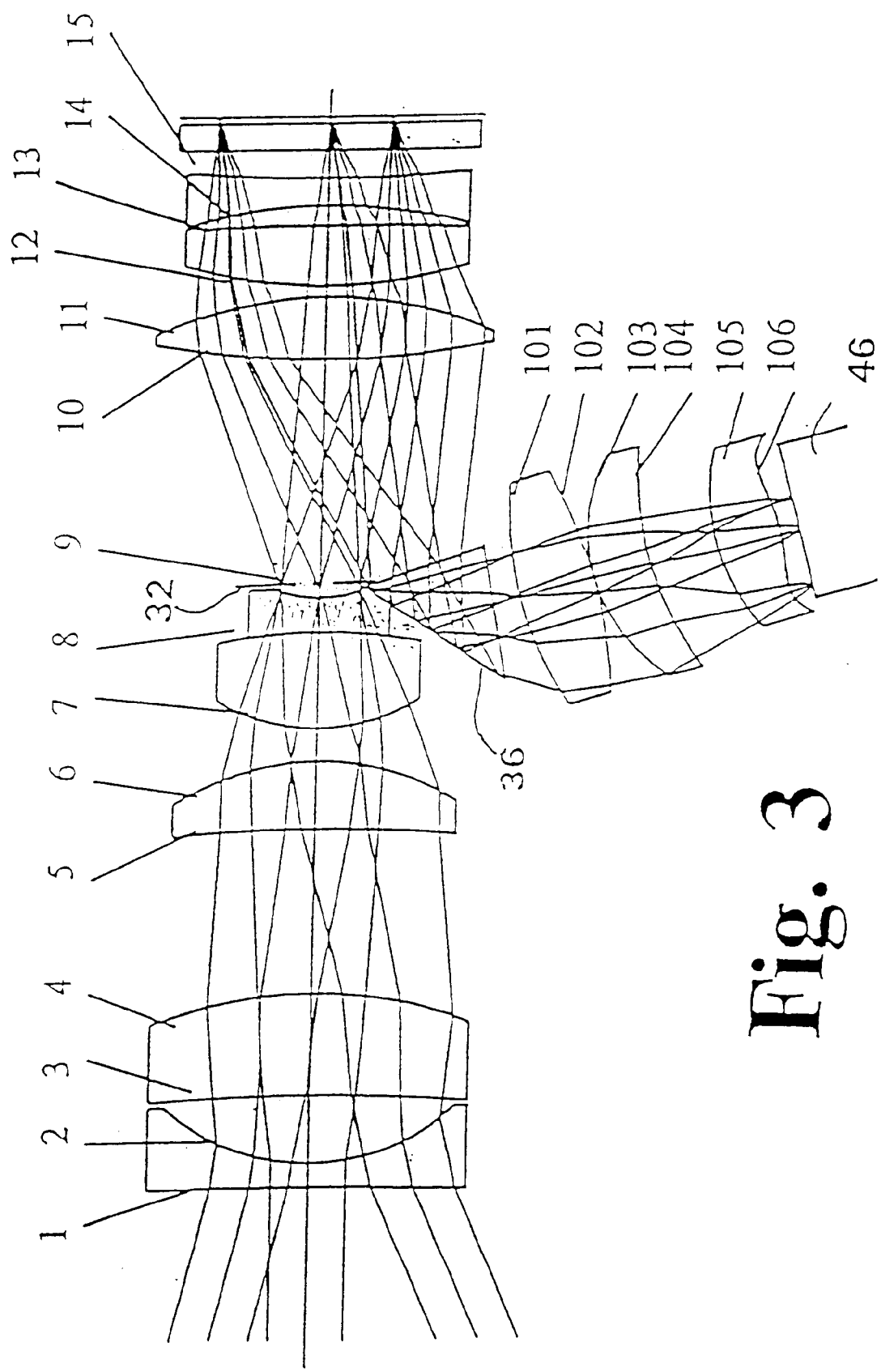
FIG. 3 shows a lens section from the example according to FIG. 2 for a detailed explanation of the utilized optics.

The beam paths through the individual lenses of optics indicated by way of example can be seen from FIG. 3. Further, the lens curvatures of these optics are indicated in greater detail in the appended Table 1. In this respect, the indicated surface number refers to the respective reference number in FIG. 3. The distance between the surfaces is given by D, the index of refraction is given by N, and v represents the Abbe number in accordance with the usual definition for characterization of the dispersion behavior. Surface number 9 refers to the intermediate image plane 32 which is also the inlet and outlet pupil of the second partial optics 24.

The lens surfaces with reference numbers 5, 15 and 106 were aspherically ground; their aspheric parameters are indicated in Table II in the usual nomenclature. The aspheric parameters K, $A_n$ define the function z, the spatial direction of the optical axis with respect to the orthogonal Cartesian coordinates x and y is defined as follows:

$$Z = \frac{H_2}{R\left(1 + \sqrt{1 - (1+K) \cdot \left(\frac{H^2}{R^2}\right)}\right)} + A_3 H^3 + A_4 H^4 + \ldots$$

where $H = \sqrt{x^2 + y^2}$.

Because of the given asphericity, as much light as possible is transmitted through the partial optics 22, 24 and 26. In particular, this is also shown in FIG. 3 in the case of lens surface 106; although a curvature is carried out substantially toward the mixing rod 46, the edges o[0086] the lens surface also engage somewhat around the output surface of the mixing rod 46. Due to this construction, almost all of the light of the mixing rod 46 is collected by the aspheric lens with the surfaces 105 and 106 and is guided further.

The dimensions of the prism 36 and its orientation to the surface 9 are also indicated again in Table III.

The use of this embodiment example for imaging DMD arrays has proven especially advantageous for the display of video images with screen diagonals greater than 2 m. As is also shown by the dimensions in Table I (column D), the optics are dimensioned so as to be very small. Since the electronics can also be maintained very small by means of miniaturization, a device results which can be carried along comfortably in a briefcase. A device of this kind is accordingly suitable especially for video presentations at fairs as well as for small artists and commercial agents desiring to show a video presentation to a large or small audience.

while the foregoing description and drawings represent the present invention, it will be obvious to those skilled in the art that various changes may be made therein without departing from the true spirit and scope of the present invention.

TABLE I

| Surface number | Radius of curvature (mm) | between surfaces | D (mm) | N | V |
|---|---|---|---|---|---|
| 1 | −450.10 | 1–2 | 2.50 | 1.6940 | 54.48 |
| 2 | 24.55 | 2–3 | 7.74 | 1.0000 | |
| 3 | −191.32 | 3–4 | 11.43 | 1.8126 | 25.24 |
| 4 | −49.62 | 4–5 | 18.71 | 1.0000 | |
| 5 | −228.80 | 5–6 | 7.48 | 1.5275 | 56.26 |
| 6 | −29.81 | 6–7 | 3.59 | 1.0000 | |
| 7 | 21.95 | 7–8 | 10.82 | 1.7923 | 47.23 |
| 8 | −58.50 | 8–9 | 3.89 | 1.8126 | 25.24 |
| 9 | 14.44 | 9–10 | 26.67 | 1.0000 | |
| 10 | 103.72 | 10–11 | 7.00 | 1.7923 | 47.23 |
| 11 | −45.14 | 11–12 | 1.13 | 1.0000 | |
| 12 | 60.17 | 12–13 | 6.60 | 1.7923 | 47.23 |
| 13 | −290.53 | 13–14 | 2.20 | 1.0000 | |
| 14 | −58.22 | 14–15 | 3.00 | 1.5275 | 56.26 |
| 15 | 433.32 | 15–Prism | 3.19 | 1.0000 | |
| Prism | | | | 1.5187 | 63.96 |
| 101 | 39.96 | 101–102 | 8.22 | 1.7923 | 47.23 |
| 102 | −56.49 | 102–103 | 0.10 | 1.0000 | |
| 103 | 20.64 | 103–104 | 5.94 | 1.7923 | 47.23 |
| 104 | 37.95 | 104–105 | 7.24 | 1.0000 | |
| 105 | 23.53 | 105–106 | 7.00 | 1.6406 | 35.09 |
| 106 | −22.73 | | 2.08 | 1.0000 | |

TABLE II

| | Aspheric parameters | | | | |
|---|---|---|---|---|---|
| Surface | K | $A_4$ | $A_6$ | $A_8$ | $A_{10}$ |
| 5 | $2.764 \cdot 10^{-3}$ | $-3.597 \cdot 10^{-6}$ | $5.025 \cdot 10^{-9}$ | $-1.582 \cdot 10^{-11}$ | $1.177 \cdot 10^{-14}$ |
| 15 | $6.860 \cdot 10^{-3}$ | $1.177 \cdot 10^{-3}$ | $-2.513 \cdot 10^{-8}$ | $-1.424 \cdot 10^{-11}$ | |
| 106 | $-1.110 \cdot 10^{-5}$ | $1.131 \cdot 10^{-4}$ | $1.798 \cdot 10^{-6}$ | $9.760 \cdot 10^{-11}$ | $-3.141 \cdot 10^{-13}$ |

Position of optically active prism surfaces relative to surface 9

TABLE III

| Horizontal position | Vertical position | Rotational angle |
|---|---|---|
| 2.62 | −9.79 | 348.25 |
| −2.77 | −10.91 | 281.75 |
| −0.93 | −19.72 | 102.24 |

What is claimed is:

1. An arrangement in which light is directed onto a surface proceeding from a light source by first optics, so that an image is formed which can be detected by second optics, comprising:

first, second and third partial optics and an optical axis as common optical axis for the first partial optics and second partial optics by which the second optics are formed;

light coming from the third partial optics and incident in said second partial optics enclosing an angle relative to the common optical axis at which the third partial optics lie outside of an area traversed by the light reflected by the reflecting surface from said second partial optics to said first partial optics, wherein an optical axis of the third partial optics encloses an angle of less than or equal to 90° with the optical axis of the second partial optics, and wherein there is provided a device for deflecting the light bundle, especially a mirror or a prism, by which the light proceeding from the third partial optics is directed into the second partial optics, and wherein a pupil surface of the second optics is provided between the first and second partial optics and the device for the deflection is at a distance from this pupil surface which is not more than half of the pupil diameter.

2. The arrangement according to claim 1, wherein the second partial optics are constructed so as to focus.

3. The arrangement according to claim 1, wherein the reflecting surface is a rectangular image-generating element, especially a tilting mirror array or a reflecting LCD, and the light bundle striking the third partial optics has a rectangular beam profile adapted to it with respect to aspect ratio.

4. The arrangement according to claim 3, wherein a mixing rod for generating the rectangular beam profile is provided in front of the third partial optics.

5. The arrangement according to claim 4, wherein an individual tilting mirror array and a color wheel are provided for displaying color images, wherein the color wheel is arranged as an outer surface area of a cylinder which is dived into sectors with filters of different colors and which covers the input surface and/or output surface of the mixing rod.

6. An arrangement in which light is directed onto a surface proceeding from a light source by first optics, so that an image is formed which can be detected by second optics, comprising:

first, second and third partial optics and an optical axis as common optical axis for the first partial optics and second partial optics by which the second optics are formed;

light coming from the third partial optics and incident in said second partial optics enclosing an angle relative to the common optical axis at which the third partial optics lie outside of an area traversed by the light reflected by the reflecting surface from said second partial optics to said first partial optics, wherein the second partial optics on the side of the reflecting surface have an aperture of greater than 0.3.

7. The arrangement according to claim 6, wherein the second partial optics on the side of the reflecting surface have an aperture of 0.5.

8. The arrangement according to claim 6, wherein the second partial optics are constructed so as to focus.

9. The arrangement according to claim 6, wherein the reflecting surface is a rectangular image-generating element, especially a tilting mirror array or a reflecting LCD, and the light bundle striking the third partial optics has a rectangular beam profile adapted to it with respect to aspect ratio.

10. The arrangement according to claim 9, wherein a mixing rod for generating the rectangular beam profile is provided in front of the third partial optics.

11. The arrangement according to claim 10, wherein an individual tilting mirror array and a color wheel are provided for displaying color images, wherein the color wheel is arranged as an outer surface area of a cylinder which is divided into sectors with filters of different colors and which covers the input surface or output surface of the mixing rod.

12. An arrangement in which light is directed onto a surface proceeding from a light source by first optics, so that an image is formed which can be detected by second optics, comprising:

first, second and third partial optics and an optical axis as common optical axis for the first partial optics and second partial optics by which the second optics are formed;

light coming from the third partial optics and incident in said second partial optics enclosing an angle relative to the common optical axis at which the third partial optics lie outside of an area traversed by the light reflected by the reflecting surface from said second partial optics to said first partial optics, wherein the third partial optics are designed for an illumination angle $\theta$ on the reflecting surface behind the second partial optics with $\sin \theta$ being less than 0.3.

13. The arrangement according to claim 12, wherein $\sin \theta$ being less than 0.2.

14. The arrangement according to claim 12, wherein an optical axis of the third partial optics encloses an angle of less than or equal to 90° with the optical axis of the second partial optics, and wherein there is provided a device for deflecting the light bundle, especially a mirror or a prism, by which the light proceeding from the third partial optics is directed into the second partial optics.

15. The arrangement according to claim 12, wherein the reflecting surface is a rectangular image-generating element, especially a tilting mirror array or a reflecting LCD, and the light bundle striking the third partial optics has a rectangular beam profile adapted to it with respect to aspect ratio.

16. The arrangement according to claim 15, wherein a mixing rod for generating the rectangular beam profile is provided in front of the third partial optics.

17. The arrangement according to claim 16, wherein an individual tilting mirror array and a color wheel are provided for displaying color images, wherein the color wheel is arranged as an outer surface area of a cylinder which is divided into sectors with filters of different colors and which covers the input surface and/or output surface of the mixing rod.

18. An arrangement in which light is directed onto a surface proceeding from a light source by first optics, so that an image is formed which can be detected by second optics, comprising:

first, second and third partial optics and an optical axis as common optical axis for the first partial optics and second partial optics by which the second optics are formed;

light coming from the third partial optics and incident in said second partial optics enclosing an angle relative to the common optical axis at which the third partial optics lie outside of an area traversed by the light reflected by the reflecting surface from said second partial optics to said first partial optics, wherein the reflecting surface is a rectangular tilting mirror array and the light bundle striking the third partial optics has a rectangular beam profile adapted to it with respect to aspect ratio, wherein a mixing rod for generating the rectangular beam profile is provided in front of the third partial optics, wherein a transmissive color wheel is provided for displaying color images, wherein the color wheel is arranged as an outer surface area of a cylinder which is divided into sectors with filters of different colors and which covers the input surface and/or output surface of the mixing rod, so that dependent on the respective filter a special color of the light of light source passes through the outer surface area of the cylinder.

19. An arrangement in which light proceeding from a light source is directed onto a reflective tilting mirror array by first optics, said tilting mirror array being used for generating an image which can be displayed on a projection screen by second optics, wherein light reflected by the tilting mirror array and used for displaying traverses said second optics as projecting light, comprising:

said tilting mirror array, first, second and third partial optics and an optical axis as common optical axis for the first partial optics and second partial optics by which the second optics are formed; said first optics including said second and third partial optics and a deflecting device comprising a single reflecting device;

light coming from the third partial optics is directed into said second partial optics by said single reflecting surface and enclosing an angle relative to the common optical axis at which the third partial optics as well as said single reflecting surface lies outside of an area traversed by the projection light from said second partial optics, wherein in a plane in which the common optical axis lies light beams of the projection light lie on both sides of the common optical axis in the region of the single reflecting mirror.

20. The arrangement according to claim 19, wherein an optical axis of the third partial optics encloses an angle of less than or equal to 90° with the common optical axis of the second optics.

* * * * *